(12) United States Patent
Williams

(10) Patent No.: US 11,649,776 B2
(45) Date of Patent: May 16, 2023

(54) TURBO-BOOST CONTROL SYSTEM

(71) Applicant: K&N Engineering, Inc., Riverside, CA (US)

(72) Inventor: Steve Williams, Cherry Valley, CA (US)

(73) Assignee: K&N Engineering, Inc., Riverside, CA (US)

( * ) Notice: Subject to any disclaimer, the term of this patent is extended or adjusted under 35 U.S.C. 154(b) by 0 days.

(21) Appl. No.: 17/383,065

(22) Filed: Jul. 22, 2021

(65) Prior Publication Data

US 2021/0348571 A1 Nov. 11, 2021

Related U.S. Application Data

(63) Continuation of application No. 16/664,702, filed on Oct. 25, 2019, now Pat. No. 11,078,852.

(60) Provisional application No. 62/751,426, filed on Oct. 26, 2018.

(51) Int. Cl.
*F02D 41/00* (2006.01)
*B60R 16/02* (2006.01)
*F02B 37/18* (2006.01)

(52) U.S. Cl.
CPC ...... *F02D 41/0007* (2013.01); *B60R 16/0207* (2013.01); *F02B 37/18* (2013.01); *F02D 2200/0406* (2013.01); *F05D 2220/40* (2013.01)

(58) Field of Classification Search
CPC ......... F02D 41/0007; F02D 2200/0406; F02D 2400/22; B60R 16/0207; F02B 37/18; F05D 2220/40; Y02T 10/12
See application file for complete search history.

(56) References Cited

U.S. PATENT DOCUMENTS

| | | | | |
|---|---|---|---|---|
| 2005/0266743 | A1* | 12/2005 | Okuyama | B63H 25/02 440/87 |
| 2009/0043485 | A1* | 2/2009 | Banks | F02B 33/40 701/114 |
| 2014/0116031 | A1* | 5/2014 | Yoshida | F02D 41/22 60/276 |
| 2019/0316538 | A1* | 10/2019 | Martin | F02B 37/10 |

* cited by examiner

*Primary Examiner* — Xiao En Mo
(74) *Attorney, Agent, or Firm* — Rutan & Tucker LLP; Hani Z. Sayed

(57) ABSTRACT

A system and methods for a turbo-boost control system are disclosed for providing a driver of a vehicle with greater control over vehicle performance. The turbo-boost control system instructs an electronic control unit of the vehicle to increase the manifold pressure to a higher level before releasing the pressure through a waste gate so as to provide a greater power output of the engine. The turbo-boost control system includes a control module, a wiring harness, and a signal adjuster. The wiring harness couples the control module with a turbo inlet pressure sensor, a manifold absolute pressure sensor, and an electronic control unit of the vehicle. The control module sends signals to the electronic control unit based on input readings from the turbo inlet pressure sensor and the manifold absolute pressure sensor. The signal adjuster includes a rheostat that enables manual adjustment of the power output of the engine.

20 Claims, 4 Drawing Sheets

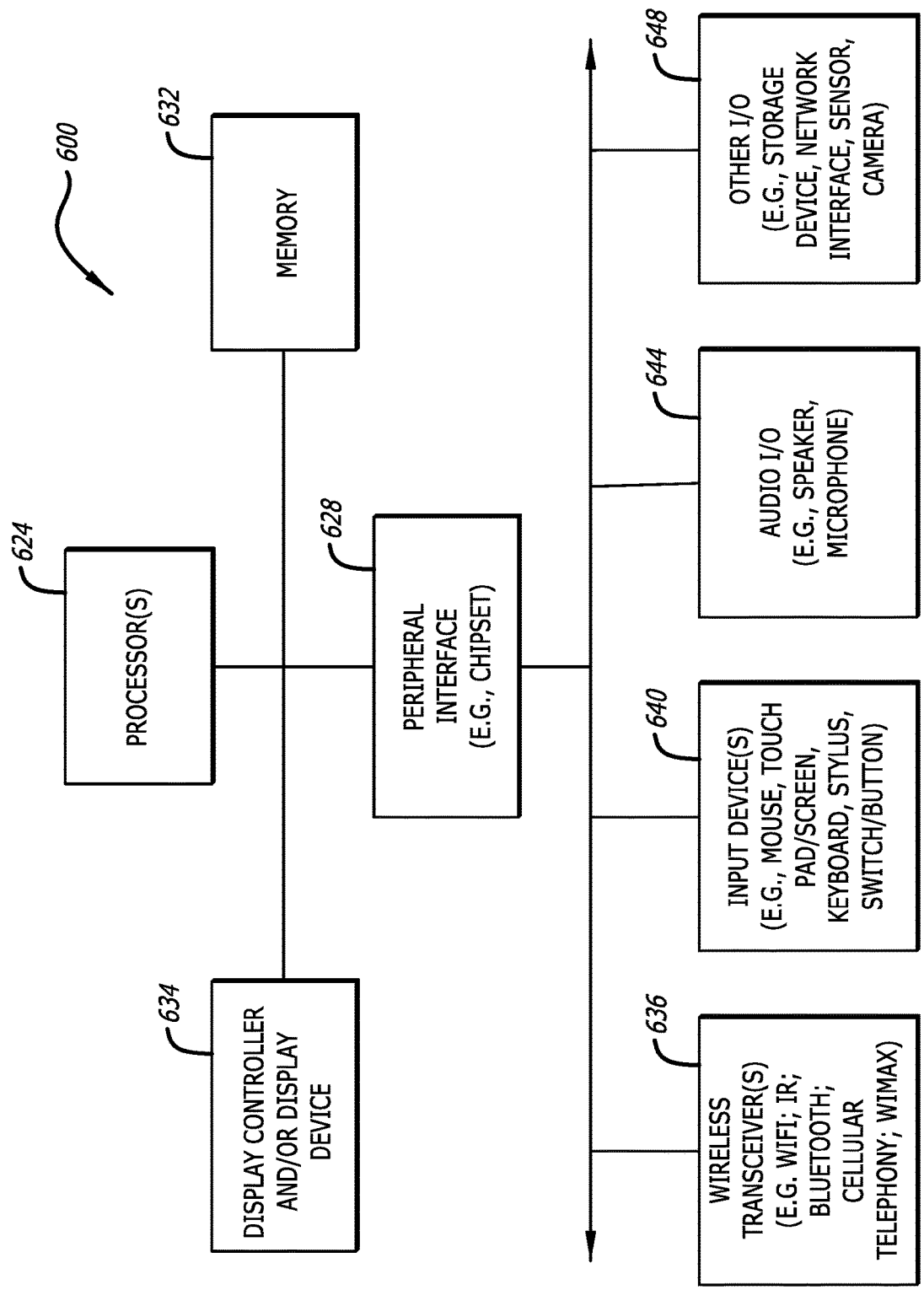

TURBO-BOOST CONTROL SYSTEM

PRIORITY

This application claims the benefit of and priority to U.S. patent application Ser. No. 16/664,702 filed on Oct. 25, 2019 and U.S. Provisional Application, entitled "Turbo-Boost Control System," filed on Oct. 26, 2018 and having application Ser. No. 62/751,426, the entirety of said application being incorporated herein by reference.

FIELD

Embodiments of the present disclosure generally relate to the field of vehicle control systems. More specifically, embodiments of the disclosure relate to a turbo-boost control system and methods that provide greater control over the power output of turbocharged engines.

BACKGROUND

A turbocharger is generally a turbine-driven, forced induction device configured to increase the efficiency and power of an engine. As compared to a naturally aspirated engine, a turbocharged engine produces greater output power because the turbine forces more air, and proportionately more fuel, into the engine's combustion chambers than atmospheric pressure alone. As will be appreciated by those skilled in the art, turbochargers were once referred to as "turbosuperchargers" when all forced induction devices were classified as "superchargers." At present, however, the term "supercharger" typically is used in reference to only mechanically driven, forced induction devices, such as by way of a belt, gear, shaft, or chain connected to the engine's crankshaft, whereas the term "turbocharger" is used in reference to a turbine driven by the engine's exhaust gas. Turbochargers find wide use with truck, car, train, aircraft, and construction equipment engines. Turbochargers typically are used with Otto cycle and Diesel cycle internal combustion engines; although more recently, turbochargers have also been found to be useful with automotive fuel cells.

A drawback to many factory turbocharged engines is that, under factory parameters, a vehicle's waste gate releases manifold pressure at a level specified by the vehicle manufacturer, thereby undesirably dropping the available power level of the vehicle. What is needed, therefore, is a turbo-boost control module capable of raising an amount of pressure within the engine's manifold to a higher level before releasing it through the waste gate, thereby maintaining more boost for when it is desired.

SUMMARY

A system and methods for a turbo-boost control system are disclosed for providing a driver of a vehicle with greater control over vehicle performance. The turbo-boost control system is configured to instruct an electronic control unit of the vehicle to increase the manifold pressure to a higher level before releasing the pressure through a waste gate so as to provide a greater power output of the engine. In an embodiment, the turbo-boost control system includes a control module, a wiring harness, and a signal adjuster. The wiring harness is configured to couple the control module with a turbo inlet pressure sensor, a manifold absolute pressure sensor, and an electronic control unit of the vehicle. The control module is configured to send signals to the electronic control unit based on input readings from the turbo inlet pressure sensor and the manifold absolute pressure sensor. The signal adjuster includes a rheostat that is configured to enable manual adjustment of the power output of the engine.

In an exemplary embodiment, a turbo-boost control system configured to provide a driver of a vehicle with greater control over vehicle performance comprises: a control module configured to signal an increase in manifold pressure before releasing the pressure through a waste gate so as to maintain additional boost for an increased power output of the engine; a wiring harness configured to couple the control module with a turbo inlet pressure sensor, a manifold absolute pressure sensor, and an electronic control unit of the vehicle; and a signal adjuster configured to facilitate manual adjustment of the power output of the engine.

In another exemplary embodiment, the control module is comprised of one or more microprocessors that can process input signals received from the turbo inlet pressure sensor and the manifold absolute pressure sensor. In another exemplary embodiment, the control module includes an internal lookup table whereby turbo inlet pressure sensor and manifold absolute pressure sensor readings may be evaluated.

In another exemplary embodiment, the control module includes a rigid enclosure and an input socket. In another exemplary embodiment, the input socket is configured to receive a signal connector comprising the wiring harness. In another exemplary embodiment, the input socket couples the control module with turbo inlet pressure sensor, the manifold absolute pressure sensor, and the electronic control unit of the vehicle. In another exemplary embodiment, the rigid enclosure is configured to withstand an environment encountered within an engine compartment of the vehicle.

In another exemplary embodiment, the wiring harness includes a cable, a turbo inlet pressure sensor connector, a turbo inlet pressure sensor harness connector, a signal connector, and a manifold absolute pressure sensor connector. In another exemplary embodiment, the turbo inlet pressure sensor connector is configured to be coupled directly with the turbo inlet pressure sensor of the vehicle. In another exemplary embodiment, the turbo inlet pressure sensor harness connector is configured to be coupled with the wiring harness that was originally coupled with the turbo inlet pressure sensor. In another exemplary embodiment, the signal connector is configured to be plugged into an input socket comprising the control module. In another exemplary embodiment, the manifold absolute pressure sensor connector is configured to be coupled with the manifold absolute pressure sensor of the vehicle for the purpose reading the air pressure within the engine manifold.

In another exemplary embodiment, the signal adjuster comprises a cable that extends from a controller connector to a rheostat. In another exemplary embodiment, the controller connector is configured to be plugged into a controller socket comprising the wiring harness. In another exemplary embodiment, the rheostat is configured to enable manual adjustment of the power output of the engine. In another exemplary embodiment, the signal adjuster includes a control dial configured to be coupled with the rheostat to facilitate hand operation of the rheostat.

In an exemplary embodiment, a method for a throttle control system to provide greater control over engine performance of a vehicle comprises: configuring a control module to signal an increase in manifold pressure before releasing the pressure through a waste gate for maintaining additional boost for an increased power output of the engine; fabricating a wiring harness for electrically coupling the control module with a turbo inlet pressure sensor, a manifold absolute pressure sensor, and an electronic control unit of the vehicle; and coupling a signal adjuster with a controller socket comprising the wiring harness for enabling manual adjustment of engine performance.

In another exemplary embodiment, configuring includes incorporating one or more microprocessors that can process input signals received from the turbo inlet pressure sensor and the manifold absolute pressure sensor. In another exemplary embodiment, configuring includes providing an internal lookup table whereby turbo inlet pressure sensor and manifold absolute pressure sensor readings may be evaluated. In another exemplary embodiment, fabricating includes configuring the wiring harness to be coupled directly with the turbo inlet pressure sensor and the wiring harness that was originally coupled with the turbo inlet pressure sensor. In another exemplary embodiment, coupling the signal adjuster includes coupling a control dial whereby power output of the engine may be manipulated by hand.

BRIEF DESCRIPTION OF THE DRAWINGS

The drawings refer to embodiments of the present disclosure in which:

FIG. 6 is a block diagram illustrating an exemplary data processing system that may be used with a turbo-boost control system according to the present disclosure.

Figure 1:
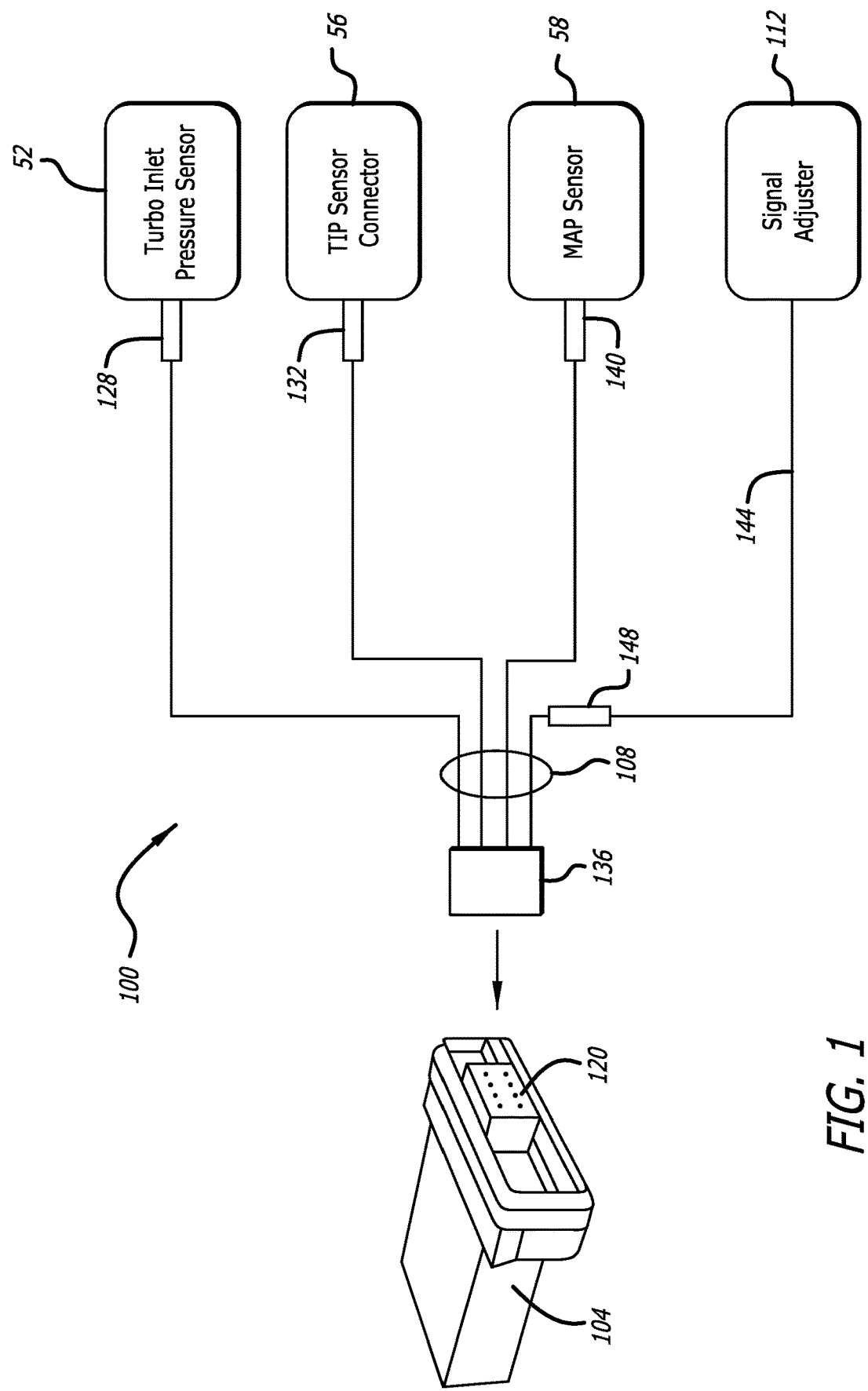
FIG. 1 illustrates an exemplary embodiment of a turbo-boost control system configured to provide a driver of a vehicle with greater control over vehicle performance.

While the present disclosure is subject to various modifications and alternative forms, specific embodiments thereof have been shown by way of example in the drawings and will herein be described in detail. The invention should be understood to not be limited to the particular forms disclosed, but on the contrary, the intention is to cover all modifications, equivalents, and alternatives falling within the spirit and scope of the present disclosure.

DETAILED DESCRIPTION

In the following description, numerous specific details are set forth in order to provide a thorough understanding of the present disclosure. It will be apparent, however, to one of ordinary skill in the art that the invention disclosed herein may be practiced without these specific details. In other instances, specific numeric references such as "first module," may be made. However, the specific numeric reference should not be interpreted as a literal sequential order but rather interpreted that the "first module" is different than a "second module." Thus, the specific details set forth are merely exemplary. The specific details may be varied from and still be contemplated to be within the spirit and scope of the present disclosure. The term "coupled" is defined as meaning connected either directly to the component or indirectly to the component through another component. Further, as used herein, the terms "about," "approximately," or "substantially" for any numerical values or ranges indicate a suitable dimensional tolerance that allows the part or collection of components to function for its intended purpose as described herein.

Factory turbocharged engines generally release manifold pressure at a level specified by the vehicle manufacturer, thereby undesirably dropping the available power level of the vehicle. The embodiments disclosed herein provide a turbo-boost control system capable of raising an amount of pressure within the engine's manifold to a higher level before releasing it through the waste gate, thereby maintaining more turbo-boost for greater power output of the engine.

FIG. 1 illustrates an exemplary embodiment of a turbo-boost control system 100 that is configured to provide a driver of a vehicle with greater control over vehicle performance. In the illustrated embodiment, the turbo-boost control system 100 includes a control module 104, a wiring harness 108, and a signal adjuster 112. The turbo-boost control system 100 generally is configured to instruct an electronic control unit (ECU) of the vehicle to increase the manifold pressure to a higher level before releasing the pressure through a waste gate so as to provide a greater power output of the engine. It is contemplated that the turbo-boost control system 100 is configured to provide a plug and play installation without requiring a practitioner to modify or fabricate components. The components comprising the turbo-boost control system 100 are discussed in greater detail herein.

Figure 2:
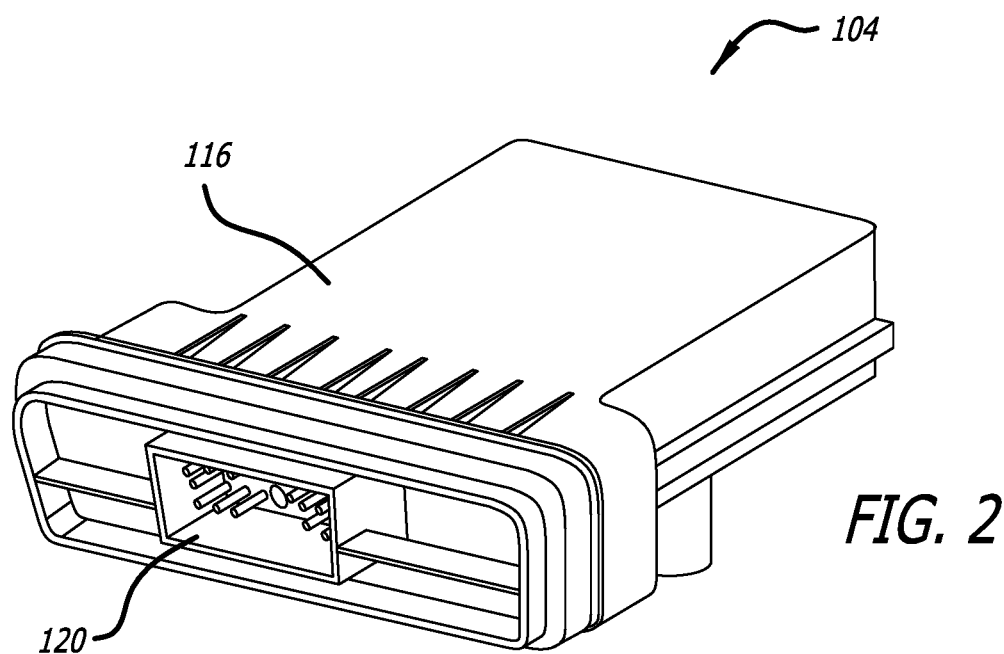
FIG. 2 illustrates an exemplary embodiment of a control module configured to create an increase in manifold air pressure before releasing the pressure through a waste gate.

FIG. 2 illustrates an exemplary embodiment of a control module 104 configured to create an increase in throttle responsiveness of a vehicle. The control module 104 generally is configured to instruct the ECU to increase the manifold pressure before releasing the pressure through the waste gate so as to maintain additional boost for an increased power output of the engine. The control module 104 may be comprised of one or more microprocessors that can process input signals received from a turbo inlet pressure (TIP) sensor 52 and a manifold absolute pressure (MAP) sensor 58 of the vehicle (see FIG. 1). As will be appreciated, the control module 104 may include hardware comprising electronic components on a printed circuit board (PCB), ceramic substrate or a thin laminate substrate, and include a micro controller chip (CPU). Software may be stored in the microcontroller or other chips on the PCB, such as EPROMs or flash memory, so that the CPU can be re-programmed by uploading updated code or replacing chips. The control module 104 preferably has a fixed programming, such as an internal lookup table whereby TIP and MAP sensor readings may be evaluated.

As shown in FIG. 2, the control module 104 includes a rigid enclosure 116 and an input socket 120. The input socket 120 is configured to receive a signal connector comprising the wiring harness 108, as discussed herein. The input socket 120 facilitates coupling the control module 104 with the TIP and MAP sensors 52, 58 (FIG. 1) of the vehicle, as well as coupling the control module 104 with the ECU of the vehicle. Further, it is contemplated that the rigid enclosure 116 is configured to withstand the environment encountered within an engine compartment of the vehicle for the purpose of protecting the internal circuitry of the control module 104.

Figure 3:
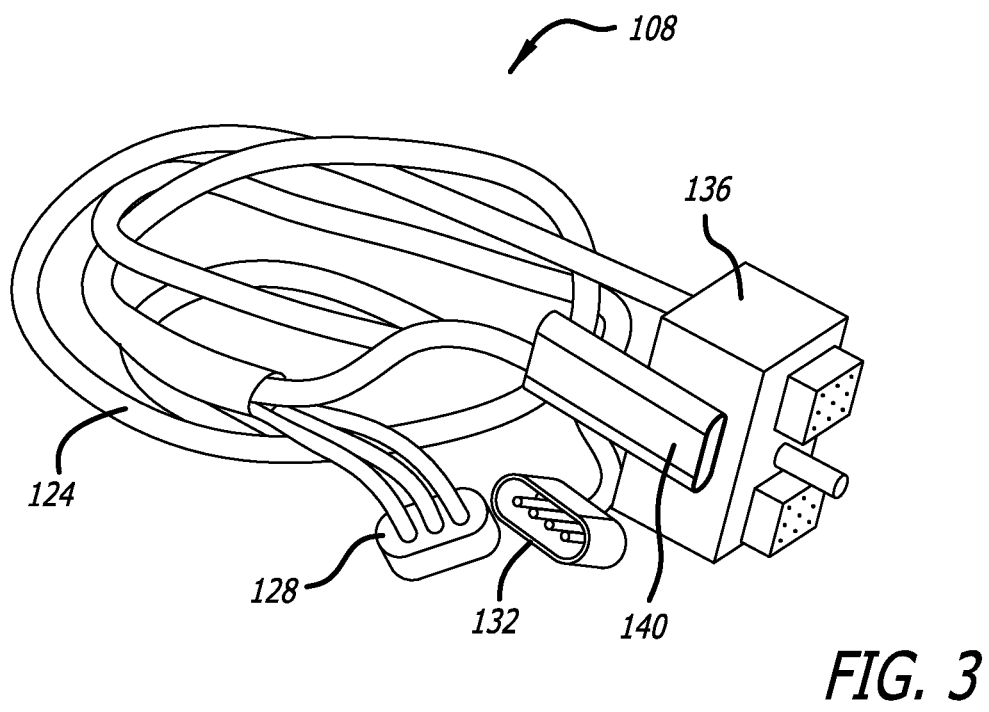
FIG. 3 illustrates an exemplary embodiment of a wiring harness configured to electrically couple the control module of FIG. 2 with a turbo inlet pressure sensor and a manifold absolute pressure sensor of the vehicle.

FIG. 3 illustrates an exemplary embodiment of a wiring harness 108 configured to electrically couple the control module 104 with the TIP and MAP sensors 52, 58 (FIG. 1) of the vehicle, as well as coupling the control module 104 with the ECU. The wiring harness 108 generally includes a cable 124, a TIP sensor connector 128, a TIP sensor harness connector 132, a signal connector 136, and a MAP sensor connector 140. As will be recognized, the cable 124 includes an exterior sheath configured to protect the cable 124 from potential damage due to nearby components comprising the vehicle. The TIP sensor connector 128 is configured to be coupled directly with the TIP sensor 52 of the vehicle, while the TIP sensor harness connector 132 is configured to be coupled with a TIP sensor connector 56 (see FIG. 1) of the wiring harness that was originally coupled with the TIP sensor 52. The signal connector 136 is configured to be plugged into the input socket 120 of the control module 104. The MAP sensor connector 140 is configured to be coupled with the MAP sensor 58 of the vehicle for the purpose reading the air pressure within the engine manifold. Thus, the wiring harness 108 effectively provide direct communication between the TIP and MAP sensors 52, 58, the control module 104, and the ECU of the vehicle.

Figure 4:
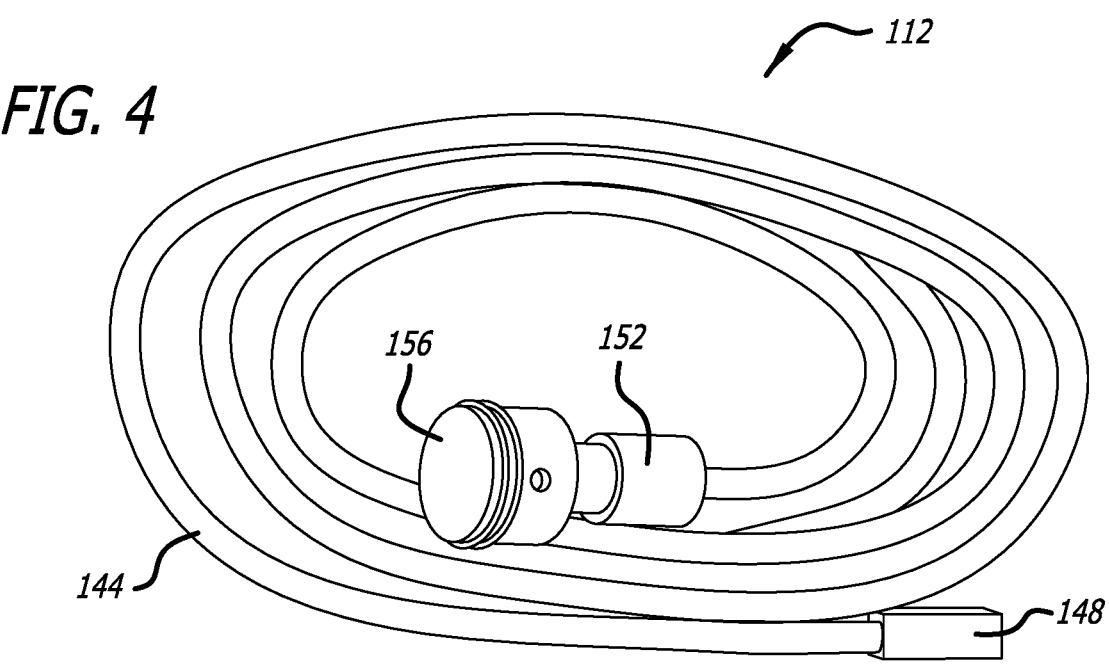
FIG. 4 illustrates an exemplary embodiment of a signal adjuster configured to facilitate manual adjustment of the turbo-boost of the vehicle.

FIG. 4 illustrates an exemplary embodiment of a signal adjuster 112 configured to facilitate manual adjustment of the power output of the engine. The signal adjuster 112 comprises a cable 144 that extends from a controller connector 148 to a rheostat 152. In the illustrated embodiment of FIG. 4, the cable 144 includes an exterior sheath configured to protect the cable 144 from potential damage due to nearby components comprising the vehicle. The controller connector 148 is configured to be plugged into a controller socket (not shown) comprising the wiring harness 108. The rheostat 152 is configured to enable a practitioner, such as the driver, to manually interact with the control module 104 so as to control the power output of the vehicle. The signal adjuster 112 includes a control dial 156 configured to be coupled with the rheostat 152 to facilitate hand operation of the rheostat. It is contemplated that the practitioner mounts the rheostat 152 and the control dial 156 in an advantageous location within the passenger cabin of the vehicle, such as a dashboard, and then routes the cable 144 to the wiring harness 108. The practitioner then plugs the controller connector 148 into the controller socket to place the rheostat 152 into electrical communication with the control module 104. It is contemplated that, in some embodiments, the signal adjuster 112 may be omitted from the turbo-boost control system 100, thereby providing a fully automated adjustment of engine power output of the vehicle.

Figure 5:
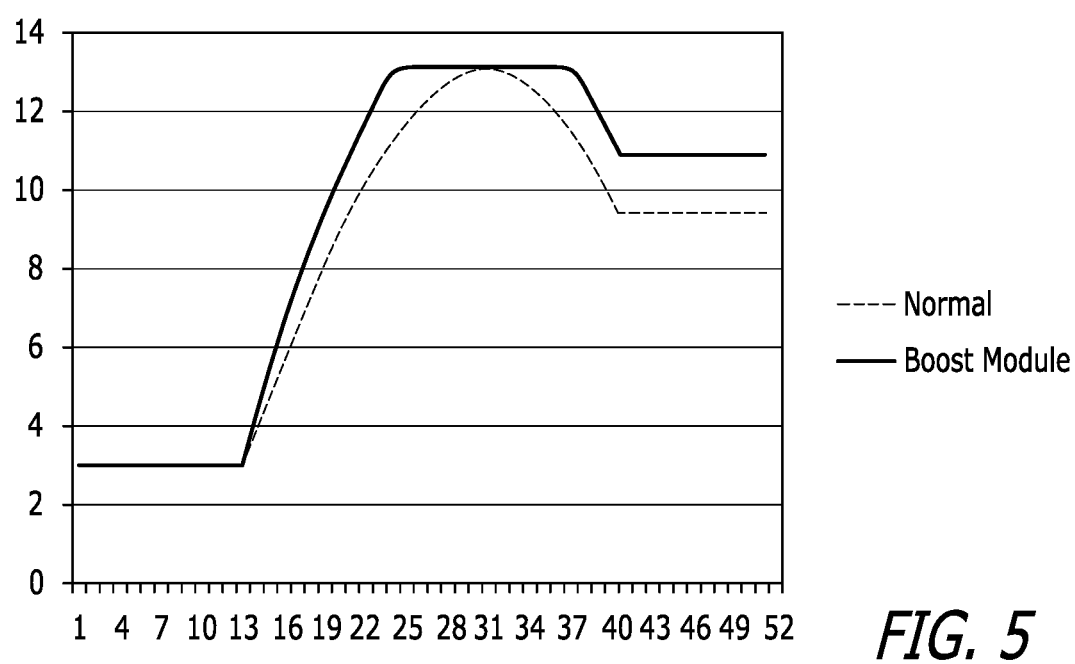
FIG. 5 is a graph illustrating manifold pressure readings by an engine control unit of the vehicle with and without the turbo-boost control system of FIG. 1.

FIG. 5 is a graph 160 illustrating manifold pressure readings by the ECU of the vehicle with and without the turbo-boost control system 100 illustrated in FIG. 1. The data plotted in the graph 160 are based on experimental observations before and after installation of the turbo-boost control system 100 into a test vehicle. During operation of the system 100, the control module 104 continuously reads the MAP and TIP sensors 58, 52 individually and compares the readings against an internal lookup table. The control module 104 then sends appropriate signals to the ECU. As indicated in graph 160, if the measured manifold pressure falls within a range specified in the lookup table, a higher target manifold pressure is signaled to the ECU. It is contemplated, however, that the higher pressure is not to exceed factory vehicle limits. Graph 160 shows, therefore, that the turbo-boost control system 100 provides a desirable increase in turbo-boost as compared with the performance provided by the factory ECU.

FIG. 6 is a block diagram illustrating an exemplary data processing system 600 that may be used with an adjustable turbo-boost control system, such as the turbo-boost control system 100 to perform any of the processes or methods described herein. System 600 may represent a desktop, a tablet, a server, a mobile phone, a media player, a personal digital assistant (PDA), a personal communicator, a network router or hub, a wireless access point (AP) or repeater, a set-top box, or a combination thereof.

In an embodiment, illustrated in FIG. 6, system 600 includes a processor 624 and a peripheral interface 628, also referred to as a chipset, to couple various components to the processor 624, including a memory 632 and devices 636-648 by way of a bus or an interconnect. Processor 624 may represent a single processor or multiple processors with a single processor core or multiple processor cores included therein. Processor 624 may represent one or more general-purpose processors such as a microprocessor, a central processing unit (CPU), and the like. More particularly, processor 624 may be a complex instruction set computing (CISC) microprocessor, reduced instruction set computing (RISC) microprocessor, very long instruction word (VLIW) microprocessor, or processor implementing other instruction sets, or processors implementing a combination of instruction sets. Processor 624 may also be one or more special-purpose processors such as an application specific integrated circuit (ASIC), a field programmable gate array (FPGA), a digital signal processor (DSP), a network processor, a graphics processor, a network processor, a communications processor, a cryptographic processor, a co-processor, an embedded processor, or any other type of logic capable of processing instructions. Processor 624 is configured to execute instructions for performing the operations and steps discussed herein.

Peripheral interface 628 may include a memory control hub (MCH) and an input output control hub (ICH). Peripheral interface 628 may include a memory controller (not shown) that communicates with a memory 632. The peripheral interface 628 may also include a graphics interface that communicates with graphics subsystem 634, which may include a display controller and/or a display device. The peripheral interface 628 may communicate with the graphics device 634 by way of an accelerated graphics port (AGP), a peripheral component interconnect (PCI) express bus, or any other type of interconnects.

An MCH is sometimes referred to as a Northbridge, and an ICH is sometimes referred to as a Southbridge. As used herein, the terms MCH, ICH, Northbridge and Southbridge are intended to be interpreted broadly to cover various chips that perform functions including passing interrupt signals toward a processor. In some embodiments, the MCH may be integrated with the processor 624. In such a configuration, the peripheral interface 628 operates as an interface chip performing some functions of the MCH and ICH. Furthermore, a graphics accelerator may be integrated within the MCH or the processor 624.

Memory 632 may include one or more volatile storage (or memory) devices, such as random access memory (RAM), dynamic RAM (DRAM), synchronous DRAM (SDRAM), static RAM (SRAM), or other types of storage devices. Memory 632 may store information including sequences of instructions that are executed by the processor 624, or any other device. For example, executable code and/or data of a variety of operating systems, device drivers, firmware (e.g., input output basic system or BIOS), and/or applications can be loaded in memory 632 and executed by the processor 624. An operating system can be any kind of operating systems, such as, for example, Windows® operating system from Microsoft®, Mac OS®/iOS® from Apple, Android® from Google®, Linux®, Unix®, or other real-time or embedded operating systems such as VxWorks.

Peripheral interface 628 may provide an interface to I/O devices, such as the devices 636-648, including wireless transceiver(s) 636, input device(s) 640, audio I/O device(s) 644, and other I/O devices 648. Wireless transceiver 636 may be a WiFi transceiver, an infrared transceiver, a Bluetooth transceiver, a WiMax transceiver, a wireless cellular telephony transceiver, a satellite transceiver (e.g., a global positioning system (GPS) transceiver) or a combination thereof. Input device(s) 640 may include a mouse, a touch pad, a touch sensitive screen (which may be integrated with display device 634), a pointer device such as a stylus, and/or a keyboard (e.g., physical keyboard or a virtual keyboard displayed as part of a touch sensitive screen). For example, the input device 640 may include a touch screen controller coupled with a touch screen. The touch screen and touch screen controller can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen.

Audio I/O 644 may include a speaker and/or a microphone to facilitate voice-enabled functions, such as voice recognition, voice replication, digital recording, and/or telephony functions. Other optional devices 648 may include a storage device (e.g., a hard drive, a flash memory device), universal serial bus (USB) port(s), parallel port(s), serial port(s), a printer, a network interface, a bus bridge (e.g., a PCI-PCI bridge), sensor(s) (e.g., a motion sensor, a light sensor, a proximity sensor, etc.), or a combination thereof. Optional devices 648 may further include an imaging processing subsystem (e.g., a camera), which may include an optical sensor, such as a charged coupled device (CCD) or a complementary metal-oxide semiconductor (CMOS) optical sensor, utilized to facilitate camera functions, such as recording photographs and video clips.

Note that while FIG. 6 illustrates various components of a data processing system, it is not intended to represent any particular architecture or manner of interconnecting the components; as such details are not germane to embodiments of the present disclosure. It should also be appreciated that network computers, handheld computers, mobile phones, and other data processing systems, which have fewer components or perhaps more components, may also be used with embodiments of the invention disclosed hereinabove.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it should be appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system's memories or registers or other such information storage, transmission or display devices.

The techniques shown in the figures can be implemented using code and data stored and executed on one or more electronic devices. Such electronic devices store and communicate (internally and/or with other electronic devices over a network) code and data using computer-readable media, such as non-transitory computer-readable storage media (e.g., magnetic disks; optical disks; random access memory; read only memory; flash memory devices; phase-change memory) and transitory computer-readable transmission media (e.g., electrical, optical, acoustical or other form of propagated signals—such as carrier waves, infrared signals, digital signals).

The processes or methods depicted in the preceding figures may be performed by processing logic that comprises hardware (e.g. circuitry, dedicated logic, etc.), firmware, software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

While the invention has been described in terms of particular variations and illustrative figures, those of ordinary skill in the art will recognize that the invention is not limited to the variations or figures described. In addition, where methods and steps described above indicate certain events occurring in certain order, those of ordinary skill in the art will recognize that the ordering of certain steps may be modified and that such modifications are in accordance with the variations of the invention. Additionally, certain of the steps may be performed concurrently in a parallel process when possible, as well as performed sequentially as described above. To the extent there are variations of the invention, which are within the spirit of the disclosure or equivalent to the inventions found in the claims, it is the intent that this patent will cover those variations as well. Therefore, the present disclosure is to be understood as not limited by the specific embodiments described herein, but only by scope of the appended claims.

What is claimed is:

1. A turbo-boost control system for increasing power output of an engine, comprising:
   a control module for interpreting signals and communicating with an electronic control unit; and
   a wiring harness for communicating signals among one or more sensors and the control module, wherein the wiring harness includes at least a turbo inlet pressure (TIP) sensor connector configured to be coupled directly with a TIP sensor of the vehicle, wherein the TIP sensor connector is further configured to be coupled with a TIP sensor harness connector thereby replacing a connection between a vehicle's factory wiring harness and the TIP sensor.

2. The control system of claim 1, further comprising a signal adjuster for enabling manual adjustment of the power output.

3. The control system of claim 2, wherein the signal adjuster includes a rheostat for enabling the manual adjustment.

4. The control system of claim 3, wherein the signal adjuster includes a control dial to facilitate hand operation of the rheostat.

5. The control system of claim 4, wherein the signal adjuster includes a cable extending from the rheostat to a controller connector to be plugged into a controller socket comprising the wiring harness.

6. The control system of claim 1, wherein the one or more sensors include any one or more of a TIP sensor, a TIP sensor harness connector, and a MAP sensor.

7. The control system of claim 1, wherein the wiring harness comprises a cable, a TIP sensor connector, a TIP sensor harness connector, a signal connector, and a MAP sensor connector.

8. The control system of claim 7, wherein the TIP sensor connector is configured to be connected to the TIP sensor of the vehicle.

9. The control system of claim 7, wherein the TIP sensor harness connector is configured to be connected to the TIP sensor connector of the vehicle.

10. The control system of claim 7, wherein the MAP sensor connector is configured to be connected to the MAP sensor of the vehicle.

11. The control system of claim 7, wherein the signal connector is configured to plugged into an input socket of the control module.

12. A method for a turbo-boost control system for increasing engine power output of a vehicle, comprising:
installing a control module onto the vehicle;
plugging a signal connector of a wiring harness into an input socket of the control module;
routing a cable of the wiring harness from the signal connector to one or more sensors onboard the vehicle; and
plugging one or more connectors into the one or more sensors, wherein the wiring harness includes at least a turbo inlet pressure (TIP) sensor connector coupled directly with a TIP sensor of the vehicle, wherein the TIP sensor connector is further coupled with a TIP sensor harness connector thereby replacing a connection between a vehicle's factory wiring harness and the TIP sensor.

13. The method of claim 12, further comprising installing a signal adjuster within reach of a driver of the vehicle.

14. The method of claim 13, wherein installing the signal adjuster includes plugging a controller connector into a controller socket comprising the wiring harness.

15. The method of claim 14, wherein installing the signal adjuster includes mounting a rheostat and a control dial within reach of the driver.

16. The method of claim 15, wherein mounting includes mounting the control dial and the rheostat on a dashboard of the vehicle and routing a cable comprising the signal adjuster to the controller socket.

17. The method of claim 12, wherein plugging the one or more connectors includes coupling a MAP sensor connector comprising the wiring harness with a MAP sensor of the vehicle.

18. The method of claim 12, wherein plugging the one or more connectors includes disconnecting a TIP sensor connector of the vehicle from a turbo inlet pressure sensor.

19. The method of claim 18, wherein plugging the one or more connectors includes coupling a turbo inlet pressure sensor harness connector comprising the wiring harness to the TIP sensor connector of the vehicle.

20. The method of claim 19, wherein plugging the one or more connectors includes coupling a turbo inlet pressure sensor connector comprising the wiring harness to the turbo inlet pressure sensor.

* * * * *